United States Patent [19]

Braun

[11] Patent Number: 4,671,394
[45] Date of Patent: Jun. 9, 1987

[54] FLUID OPERATED CLUTCH OVERRIDE CONTROL SYSTEM

[75] Inventor: Eugene R. Braun, Royal Oak, Mich.

[73] Assignee: Eaton Corporation, Cleveland, Ohio

[21] Appl. No.: 885,493

[22] Filed: Jul. 14, 1986

Related U.S. Application Data

[63] Continuation-in-part of Ser. No. 713,054, Mar. 18, 1985, abandoned.

[51] Int. Cl.⁴ .............................................. F16D 25/14
[52] U.S. Cl. .................................. 192/3.57; 192/4 A; 192/83; 192/91 R; 192/109 R
[58] Field of Search .................... 192/3.57, 3.58, 4 A, 192/3 H, 83, 91 R, 109 R, 3 S, 109 F

[56] References Cited

U.S. PATENT DOCUMENTS

| | | | |
|---|---|---|---|
| 2,260,280 | 10/1941 | Bottner | 192/91 R |
| 2,362,242 | 11/1944 | Casler | 192/91 R |
| 2,633,948 | 4/1953 | Neracher et al. | 192/91 R |
| 2,935,999 | 5/1960 | Hock et al. | 192/109 F X |
| 3,273,679 | 9/1966 | Uher | 192/0.076 X |
| 3,752,282 | 8/1973 | Espenshied | 192/83 X |
| 4,081,065 | 3/1978 | Smyth et al. | 192/0.076 |
| 4,361,060 | 11/1982 | Smyth | 192/0.092 X |

*Primary Examiner*—George H. Krizmanich
*Attorney, Agent, or Firm*—D. A. Rowe; A. E. Chrow

[57] ABSTRACT

Provided is an improved fluid operated clutch control system (80) of the normally disengaged type and control system (100) of the normally engaged type that both employ a control valve (22) operative to selectively provide a fluid signal from a fluid pressure supply source (24) to a first fluid operated actuator preferably in the form of a piston (9) operative in the case of system (80) to overcome a reslient biasing device (26) and move the clutch to the engaged condition upon receipt by the control valve of an actuating signal normally provided either by depression of a clutch pedal (50) for a standard transmission or by a sensor (52, 53) for an automatic transmission and in the form of a piston (9A) for system (100) operative to overcome a resilient biasing device (26A) and move the clutch to the disengaged condition. The improvement being characterized by systems (80) and (100) being respectively provided with an override device in the form of piston (31, 31A) that are each continuously connected to supply source (24) and are operative to overcome a respective resilient biasing device (48, 48A) and, in the case of system (80), move the clutch to the engaged condition when the fluid pressure falls below a predetermined value and, in the case of system (100) move the clutch to the disengaged condition when the fluid pressure falls below a predetermined value.

29 Claims, 3 Drawing Figures

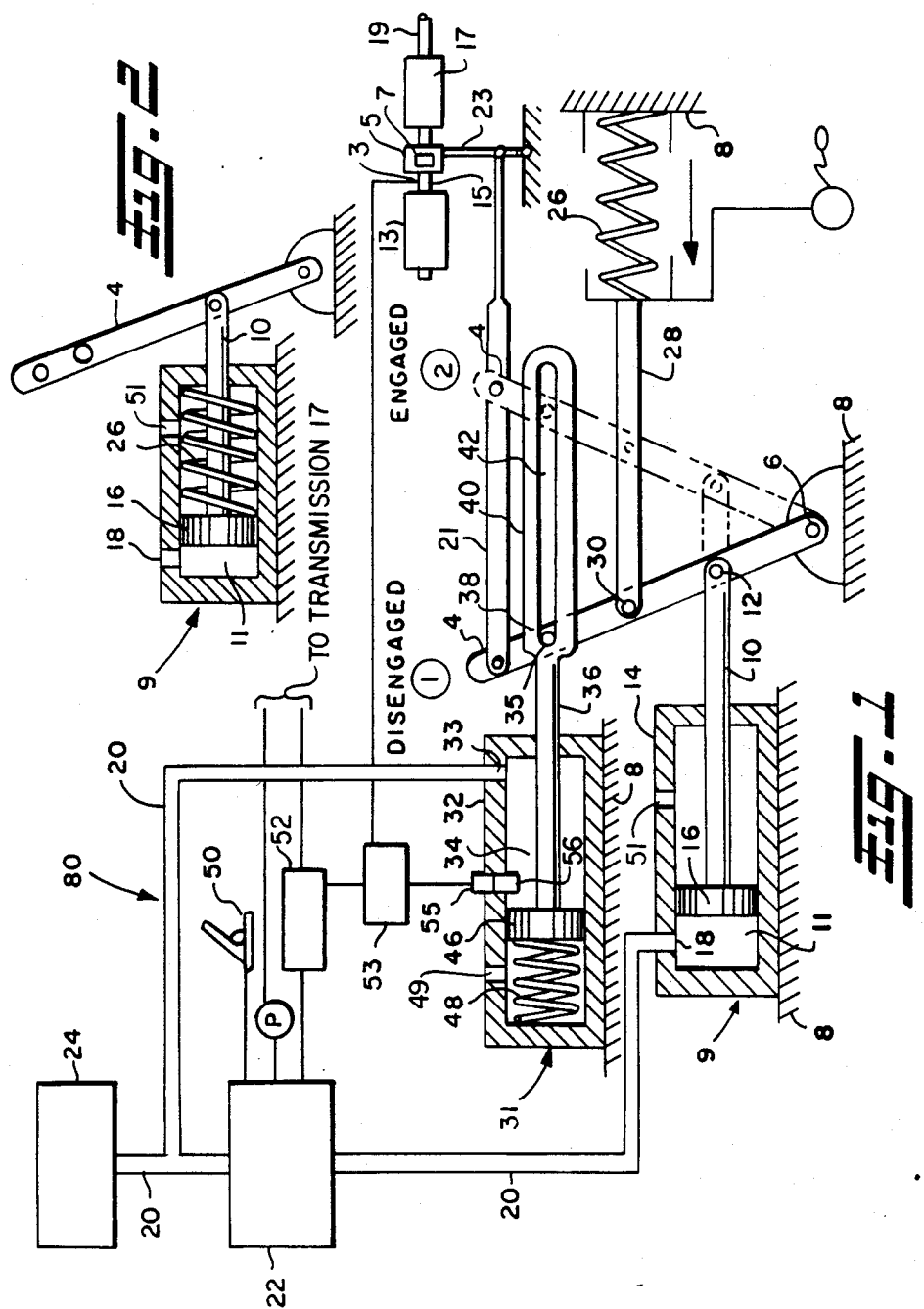

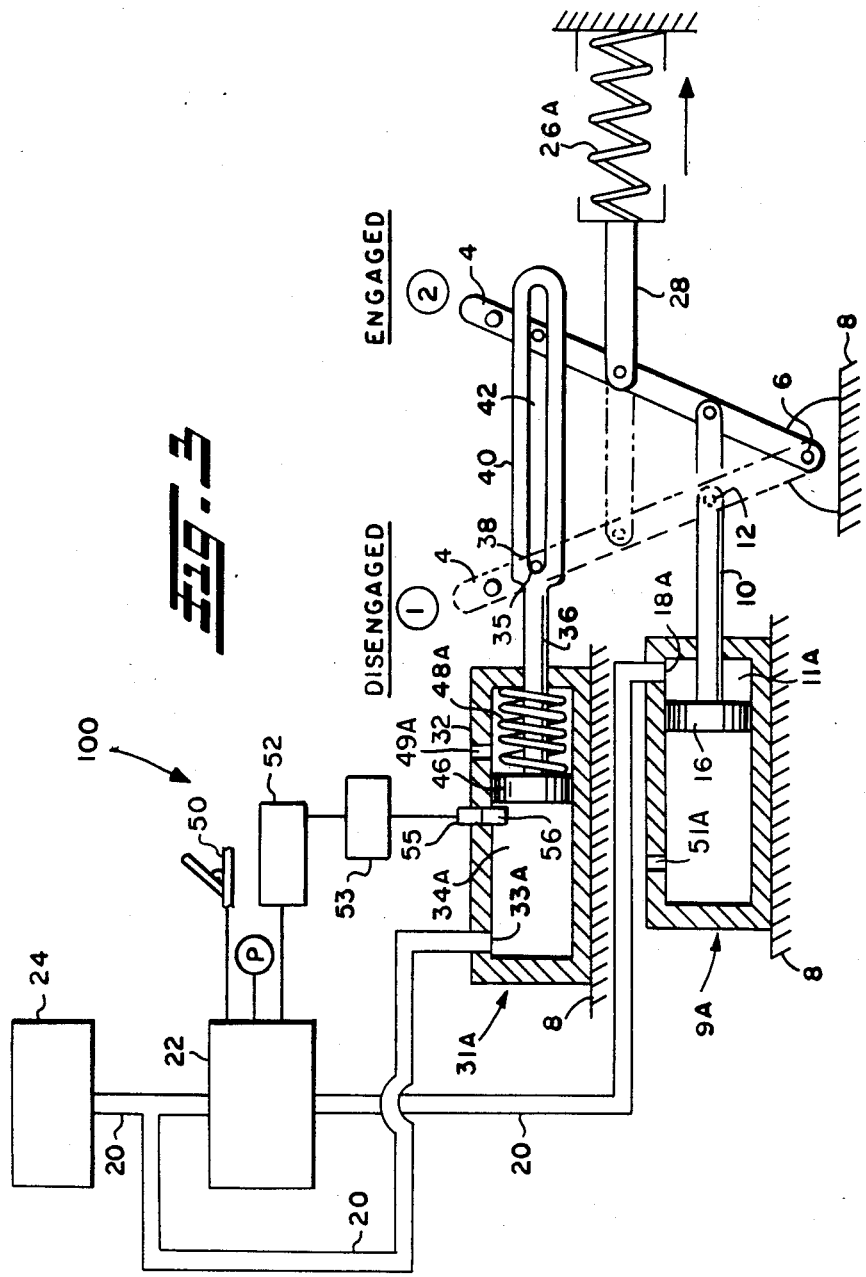

FLUID OPERATED CLUTCH OVERRIDE CONTROL SYSTEM

INTRODUCTION

This application is a continuation-in-part of application Ser. No. 713,054 filed Mar. 18, 1985, now abandoned.

This invention relates generally to a fluid operated clutch control system for engaging and disengaging a driven member from a drive member and more particularly to such control system wherein the clutch is of either the resiliently biased normally disengaged or engaged type and the driven member is an input member of a gear selecting transmission and the drive member is driven by a vehicular engine and means are included to respectively automatically engage or disengage the clutch when the fluid pressure falls below a predetermined value.

BACKGROUND OF THE INVENTION

Fluid pressure operated clutch control systems for engaging and disengaging the driven member of a gear selecting transmission with a drive member such as a vehicular engine crank shaft, whether automatic or operator controlled, have been known for many years. Such systems are particularly advantageous when a source of fluid pressure already exists such as for example in motor vehicle applications where pressurized air or hydraulic fluid is used for braking purposes.

Generally such systems employ a transmission having an input or driven member that rotates when engaged with a drive member rotated by an engine crankshaft to enable the transmission to provide various gear ratio outputs to an output shaft such as a vehicle drive shaft. It is highly preferable to shift between gears of a transmission when the driven member of the transmission is disengaged from the engine drive member to prevent damage to the transmission gear train. Thus, the purpose of the clutch is to disengage the engine drive member from the transmission driven member while the gear shift is being made and, once made, re-engage the two together. Such can be accomplished in standard transmissions by depressing a clutch pedal and in automatic transmissions by use of engine speed sensors and other circuitry resulting in the automatic shift of gears at selected engine or transmission output speeds. Prior art clutches are normally either of the spring biased normally engaged or disengaged type. In certain situations, such as in automatic clutch systems for automatic mechanical transmission systems as illustrated in U.S. Pat. Nos. 4,081,065 and 4,361,060, the disclosures of which are hereby incorporated by reference, normally disengaged clutches may be preferable.

One of the potential problems with pressurized fluid type clutch systems utilizing normally disengaged clutches is their loss of function as a result of loss of fluid pressure for one reason or another for in most cases loss of fluid pressure will result in disengagement of the clutch which results in free-wheeling and loss of engine braking on the vehicle. Alternatively, loss of fluid pressure in a normally engaged fluid pressure clutch system to a value below a predetermined value may require hand disengagement by an operator for such systems in the past have not been provided with means for automatically disengaging the clutch.

Accordingly, it is highly desirable that fluid pressure controlled clutch systems utilizing normally disengaged clutches be provided with means of automatically insuring that the transmission becomes or remains engaged with the engine drive member when the fluid pressure drops below a predetermined minimum level and that normally engaged clutch systems are provided with means of automatically disengaging the clutch.

SUMMARY OF THE INVENTION

Accordingly, it is an object of this invention to provide an improved fluid operated clutch control system for engaging and disengaging a driven member from a drive member.

It is another object of this invention to provide an improved fluid controlled clutch system of the normally disengaged type for engaging and disengaging a driven member of a gear selecting transmission of a drive member driven by a vehicular engine that is able to automatically establish or maintain the engagement in the event of loss of fluid pressure below a predetermined value.

It is still another object of this invention to provide an improved fluid controlled clutch system of the normally engaged type for engaging and disengaging a driven member of a gear selecting transmission from a drive member driven by a vehicular engine that is automatically able to disengage the driven member in the event of loss of fluid pressure below a predetermined value.

BRIEF DESCRIPTION OF THE DRAWINGS

FIG. 1 is a combined cross-sectional and block diagram view of an embodiment of the improved fluid pressure operated clutch system of the invention where the clutch is of the normally disengaged type;

FIG. 2 shows a part cross-sectional view of an alternate arrangement of a fluid pressure piston of the system of FIG. 1; and FIG. 3 shows a combined cross-sectional and block diagram view of an embodiment of the improved fluid operated clutch system of the invention where the clutch is of the normally engaged type.

DESCRIPTION OF SOME PREFERRED EMBODIMENTS

FIG. 1 shows a preferred embodiment of a fluid pressure operated clutch system 80 of the invention where the clutch is of the normally disengaged type. System 80 has a control member 4 that is moveable between first position 1 and second position 2. For illustrative purposes, when member 4 is at position 1, the clutch has disengaged the drive member 5 driven by an engine 13 from a driven input member 7 of a transmission 17 as previously described. Drive member 5 is driven by crankshaft 15 of engine 13 and drive shaft 19 is driven by transmission 17..When member 4 is at position 2, as shown in dashed line form, the clutch has engaged the drive member with the transmission driven input member. Understandably, the reverse condition resulting from re-arranging the various components is within the scope of the invention. Although any suitable connection may be used, the linkage to the clutch plate enabling movement of member 4 between the first and second positions to respectively disengage and engage the drive member and transmission driven member preferably comprises link member 21 pivotly mounted at one end to member 4 and at an opposite end to pivotal link member 23 which is operative to engage or disengage drive member 5 from driven member 7. Preferably, member 4 is in the form of a control arm or lever pivotably mounted at one end to frame 8 which may be a portion of the housing of the transmission itself by means of pivot pin 6 so that member 4 rotates about pivot pin 6 between positions 1 and 2 as shown in FIG. 1. Appropriate linkages may be used to engage and disengage the clutch plate according to the manner in which member 4 moves between positions 1 and 2.

First fluid operated actuator means preferably in the form of piston means 9 is operably connected to control member 4. In cases where member 4 rotates about a fixed pivot point as shown in FIG. 1, an end of piston rod 10 of piston means 9 may be pivotably mounted such as by pivot pin 12 so as not to interfere with the rotary motion of member 4. Piston means 9 comprises a fluid tight cylinder 14 having an inner chamber 11 containing head 16 of piston rod 10. Cylinder 14 has an entry port 18 for receiving pressurized fluid such as air or hydraulic fluid into chamber 11 and a vent port 51 to prevent compression of fluid on the back side of piston head 16. Piston means 9 is secured to frame 8 or other suitable frame restricted against movement and it can readily be seen that introduction of fluid through port 18 into chamber 11 on the backside of head 16 under sufficient pressure to overcome the force of spring 26 and the inertia of piston rod 10 and member 4 and its connecting linkage with the clutch plate will cause piston rod 10 to move member 4 from position 1 to position 2.

First resilient biasing means preferably in the form of previously mentioned coiled spring 26 is secured to frame 8 and operably connected to member 4 by means of rod 28 having one of its ends pivotably mounted to member 4 such as by means of pivot pin 30 shown in FIG. 1. Alternatively, spring 26 may be an internal part of the clutch to provide the normally disengaged condition of the clutch previously described and the term "normally disengaged" includes the use of such resilient biasing means. In FIG. 1, spring 26 is in an extended condition. Spring 26 is selected to provide a spring force sufficient to urge member 4 from position 2 to position 1 when the fluid pressure on the backside of head 16 in chamber 11 of piston means 9 drops below some predetermined value to provide the previously described normally disengaged type of clutch system. Thus, for a particular range of fluid pressure, the combination of piston means 9 and biasing means such as coiled spring 26 is able to move member 4 back and forth between positions 1 and 2 as described.

Piston means 9 receives pressurized fluid from control valve means 22 by means of suitable tubing 20. Valve means 22 receives pressurized fluid from a suitable supply source 24 through suitable tubing 20 as shown in FIG. 1. Pressurized fluid source 24 may be a chamber containing pressurized fluid such as air that is pressurized by means of an air compressor driven by a vehicular engine as previously described.

Valve means 22 may be any suitable valve able to receive pressurized fluid and provide a pressurized fluid output signal therefrom that is controlled in the manner desired to move member 4 from position 1 to position 2. Valve means 22 is operative to provide the pressurized fluid output signal or cease provision of the output signal according to whether it receives an actuating or deactuating signal from either a clutch pedal 50 when system 80 is used with a standard transmission or control means 52 when system 80 is used with an automatic transmission. Control means 52 is operative to sense one or more conditions such as engine speed such as provided by signal 25 provided by speed sensor 3 operative to sense rotational speed of crank shaft 15 or output speed, throttle position, transmission control arm position, or other conditions and provide either an actuating signal or a deactuating signal by comparing the sensed condition to a predetermined condition.

In the case of a standard transmission, pressing pedal 50 down by an operator provides an actuating signal to valve means 22 which causes valve means 22 to provide a controlled fluid pressure output signal that is received by piston means 9 which in turn operates to apply the clutch by moving control member 4 from position 1 to position 2. When the operator releases pedal 50, valve means 22 ceases to provide the same controlled output signal but rather none or one sufficiently lower in value to enable spring 26 to urge member 4 from position 2 to position 1 as previously described.

In cases where system 80 is used in conjunction with an automatic transmission, valve means 22 includes previously described control means 52 for providing actuating and deactuating signals to valve means 22 according to, for example, the speed of the engine being sensed by control means 52. Circuitry, not shown, can be used to provide the deactuating signal to valve means 22 when, for example, the engine speed reaches a particular rpm at which it is desired to shift gears of the transmission and to provide the actuating signal to valve means 22 after the shift has been made.

Means such as comparator 53 hereinafter described may also be included for comparing a speed sensed by control means 52 to a preset speed condition such as, for example, transmission output shaft rpm corresponding to a vehicle speed of 5 mph and operate to provide an actuating signal to valve means 22 to insure that valve means 22 provides the output signal to piston means 9 which in turn moves or maintains member 4 in engagement position 2 or provides a deactuating signal to valve means 22 causing valve means 22 to cease providing the output signal to piston means 9 which in turn enables spring 26 to move member 4 to the disengaged position.

Additionally, system 80 may be operative where the transmission includes a park "P" position which provides an actuating signal to valve means 22 to provide the output signal causing piston means 9 to move member 4 to engaged position 2.

The first biasing means such as spring 26 may be incorporated into first piston means 9 as shown in FIG. 2 where such is desired or it may be internal to the clutch as previously described. Deposing spring 26 in chamber 11 on the side of head 16 facing piston rod 10 and introducing and varying the controlled fluid pressure output signal into chamber 11 on the opposite side of head 16 enables piston rod 10 to move back and forth and accordingly move member 4 between positions 1 and 2. The combination of previously described pressure source 24, control valve means 22, and clutch pedal for standard transmission or control means 52 preferably including comparator means 53 for automatic transmissions for engaging and disengaging a driven member of a gear selecting transmission with a drive member such as a vehicular engine crankshaft is well known in the art.

The manner by which system 80 is able to automatically maintain or move control member 4 into engaged position 2 in the event of complete loss of fluid pressure or reduction thereof to a value below some predetermined minimum value is hereinafter described with reference to a second fluid operated actuator means preferably in the form of piston means 31.

Piston means 31 is constantly connected to fluid supply 24 and is operable to receive pressurized fluid from supply 24 through tubing 20 as shown in FIG. 1. Piston means 31 has a fluid tight cylinder 32 enclosing chamber 34 into which the pressurized fluid is introduced by means of port 33 on the side of head 46 facing towards piston rod 36 and has a vent port 49 on the opposite side of head 46 to prevent fluid compression from inhibiting operation of piston rod 36. Second resilient biasing means such as coiled spring 48 is preferably disposed in chamber 34 on the opposite side of head 46. When control member 4 is in position 1 as shown in FIG. 1, the pressurized fluid is able to compress spring 48 as shown. Spring 48 is chosen to provide a spring force that is able to urge piston rod 36 towards the viewer's right when the fluid pressure in chamber 34 drops to zero or otherwise drops below some predetermined minimum level. Piston rod 36 is operatively connected to control member 4 in such a manner that enables member 4 to move between positions 1 and 2 as previously described yet enables piston means 31 to move member 4 from position 1 to position 2 when for one reason or another fluid pressure supply 24 is unable to provide pressurized fluid to chamber 34 above a predetermined minimum level.

System 80 may additionally include latch means such as stop pin 56 that is moveable for example by solenoid 55 controlled by control member 52 or comparator 53 as the case may be and is operable to prevent spring 48 from moving the clutch preferably by entering chamber 34 of piston means 31 and engaging piston head 46 to prevent it from moving and thus prevent member 4 from moving from position 2 to position 1 upon receipt of an actuating signal from comparator 53 when, for example, the vehicle speed sensed by control means 52 falls below a predetermined minimum reference speed for example of 5 mph or, alternatively, climbs above a predetermined maximum value.

Preferably, the end of piston rod 36 is provided with a slotted member 40 having a slot 42 into which extends a pin 38 from member 4 which rests against end 35 of slot 42 when member 4 is in position 1 as shown in FIG. 1 enabling end 35 of member 40 to press against and urge control member 4 from position 1 to position 2 when the spring force of spring 48 becomes greater than the force of the fluid pressure in chamber 34 of piston means 31. Conversely, arm 4 remains at position 1 as long as the fluid pressure delivered to chamber 34 of piston means 31 remains above a predetermined minimum value. The combination of the second fluid actuated device means, second resilient biasing means and the linkage linking the second fluid actuated device means with control arm 4 herein described is broadly termed "override means" for the purposes of this invention.

It is to be understood that the invention includes members other than member 40 which enable movement of piston rod 36 to move member 4 from position 1 to position 2 yet enable free movement of member 4 between positions 1 and 2 when the spring force of the spring 48 is less than the counter force provided by the fluid pressure in chamber 34. Preferably, system 80 also includes linkage means operable to enable an operator to override biasing means 48 for start up when fluid pressure is low as shown by the solid line connection of reference "0" in FIG. 1.

FIG. 3 shows an embodiment of the fluid pressure operated clutch system of the invention in the form of system 100 for use with a clutch of the normally engaged type.

Excepting for distinguishing particularities with respect to the operation of the first and second fluid operated actuator means and the resilient biasing means biasing the clutch in the engaged condition, system 100 is substantially the same as previously described for system 80.

In system 100, a spring 26A urges arm 4 into engaged position 2 as shown in FIG. 3. Although shown connected to arm 4 by means of a connecting arm 28 as in system 80, spring 26A may be internal to the clutch and not required to be separately connected to arm 4.

First fluid operated acutator means in the form of piston means 9A is provided with a vent port 51A and receives controlled fluid pressure into chamber 11A through port 18A from tubing 20. The controlled fluid pressure is provided by control valve means 22 which in turn receives fluid pressure from fluid pressure source 24 and delivers controlled fluid pressure according to whether it receives an actuating or deactuating signal from a clutch pedal in the case of a standard transmission or from a control means such as control means 52 in the case of an automatic transmission as previously described.

Piston 9A includes a piston rod 10 having a cylinder head 16 within chamber 11A. Piston rod 10 is coupled by pin 12 to arm 4. It can readily be seen that introduction of controlled fluid pressure into chamber 11A on the side of head 16 facing towards rod 10 sufficient to provide a force overcoming the force of spring 26A causes head 16 and rod 10 to move arm 4 towards the viewer's left into disengaged position 1 upon receipt by valve means 22 of an actuating signal. Conversely, when fluid pressure is cut off from chamber 11A or otherwise is insufficient to provide a force sufficient to overcome the force of spring 26A, arm 4 is caused to move towards the viewer's right into engaged position 2. Thus, arm 4 is able to be moved back and forth between the engaged and disengaged positions according to whether valve means 22 received an actuating or deactuating signal as is well known in the art.

The improvement provided by system 100 with respect to automatically placing the clutch in a disengaged condition when the fluid pressure of the supply source drops below a predetermined value is hereinafter described with respect to second fluid operated actuator means in the form of piston means 31A, resilient biasing means in the form of spring 48A, and the means by which piston 31A is connected to arm 4, the combination being called "override means" for the purposes of this invention.

Fluid pressure is constantly received into chamber 34A of piston 31A through port 33A from fluid pressure source 24 on the side of piston head 46 facing away fom piston rod 36 as shown in FIG. 3. Chamber 34A is surrounded by wall 32A having a vent port 49A communicating with chamber 34A to prevent compression of fluid on the side of head 46 facing toward piston rod 36. Spring 48A is disposed in chamber 34A on the side of head 46 facing towards piston rod 36. As long as the fluid pressure in chamber 34A remains above a predetermined value, head 46 and rod 36 remain in the position shown in FIG. 3. Rod 36 provides part of the connection to device 40 previously described enabling arm 4 to move back and forth between disengaged position 1 and engaged position 2 as long as fluid pressure in chamber 34A remains above a predetermined value.

Spring 48A is selected to provide a force sufficient to move head 46, rod 36 and device 40 towards the viewer's left which causes arm 4 to move into disengaged position 1 whenever the fluid pressure in chamber 34A drops below a predetermined value. Thus, system 100 is able to provide a conventional fluid pressure clutch system of the normally engaged type with means by which the clutch is able to be placed in a disengaged condition whenever the fluid pressure from the fluid pressure source drops below a predetermined value.

Although not shown in the FIGURES, the clutch system of the invention may also include means for moving control arm 4 to the engaged condition for parking even when the fluid pressure is zero or has fallen below a predetermined minimum value.

Although, the present invention has been set forth with a certain degree of particularity, it is understood that various modification and substitution and rearrangement of the components are possible without departing from the spirit and the scope of the invention hereinafter claimed.

What is claimed is:

1. An improved control system for a fluid operated clutch of the type normally in a disengaged condition and operable to engage and disengage a drive member from a driven member, said system of the type comprising a source of pressurized fluid and first fluid operated actuator means operatively connected to the clutch and selectively connectable to said fluid source for changing said clutch to an engaged condition in response to an actuating signal received thereby, and said improvement characterized by said system including overide means comprising resilient biasing means and a second fluid operated actuator means operatively connected to said clutch and constantly connected to said fluid source, said biasing means operative to change said clutch to the engaged condition thereof whenever said fluid source pressure falls below a predetermined value, and said second fluid operated actuator means operative to overcome said biasing means and allow said first fluid operated actuator means to change said clutch between the engaged and disengaged conditions thereof as long as said fluid source pressure remains above said predetermined value.

2. An improved control system for a fluid operated clutch of the type normally in an engaged condition and operable to engage and disengage a drive member from a driven member, said system of the type comprising a source of pressurized fluid and a first fluid operated actuator means operatively connected to said clutch and selectively connectable to said fluid source for changing said clutch to a disengaged condition in response to an actuating signal received thereby, said improvement characterized by said system including override means comprising resilient biasing means and a second fluid operated actuator means operatively connected to said clutch and constantly connected to said fluid source, said biasing means operative to change said clutch to the disengaged condition thereof whenever said fluid source pressure falls below a predetermined value, and said second fluid operated actuator means operative to overcome said biasing means and allow said first fluid operated actuator means to change said clutch between the engaged and disengaged conditions thereof as long as said fluid source pressure remains above said predetermined value.

3. The system of claim 1 or 2 wherein the clutch includes a clutch pedal and said actuating signal is provided by depression of the clutch pedal by an operator.

4. The system of claim 1 or 2 wherein said clutch is automatic and control means is included for sensing at least one condition and providing said actuating signal according to the value of the condition sensed.

5. The system of claim 4 wherein the control means includes a speed sensor and the condition sensed is speed of a selected member.

6. The system of claim 1 wherein the clutch is operatively connected to a vehicular transmission including a park condition and said actuating signal is provided when the clutch is placed in the park condition by an operator.

7. The system of claim 2 wherein the clutch is operatively connected to a vehicular transmission including a park condition and said clutch remains in the engaged condition when the transmission is placed in the park condition by an operator.

8. The system of claim 1 or 2 wherein said first fluid operated actuator means comprises a control valve means and a first piston means, said first piston means connected to said valve means and operative to move the clutch between said engaged and disengaged conditions, and said valve means connected to said fluid source and operative to receive said actuating signal.

9. The system of claim 1 or 2 wherein the second fluid operated actuator means comprises a piston means.

10. The system of claim 9 wherein the resilient biasing means is disposed within a chamber of said piston means.

11. The system of claim 4 including a stop pin operable to move through a wall surrounding said second fluid actuator means and prevent the biasing means from changing the clutch condition when the condition sensed by the control means reaches a predetermined value.

12. The system of claim 11 wherein the condition sensed is speed of a selected member and the predetermined value is a selected minimum speed of the selected member below which the stop pin is operative to prevent the biasing means from changing the clutch condition.

13. The system of claim 11 wherein the condition sensed is speed of a selected member and the predetermined value is a selected maximum speed of the selected member above which the stop pin is operative to prevent the biasing means from changing the clutch condition.

14. The system of claim 1 including linkage means operative to overcome the biasing means to disengage the clutch.

15. The system of claim 1 or 2 wherein the driven member is an input member of a gear selecting transmission.

16. The system of claim 1 or 2 wherein the driven member is an input member of a gear selecting transmission and the drive member is driven by a vehicular engine.

17. An improved control system for a fluid operated clutch of the type normally in a disengaged condition and operable to engage and disengage a driven member of a gear selecting transmission from a drive member driven by a vehicular engine, said system of the type comprising a source of pressurized fluid and control valve means connectable to said fluid source and to a first fluid operated actuator means operatively connected to the clutch and operable to change the clutch to the engaged condition thereof in response to an actuating signal received by said valve means, and said improvement characterized by said system including override means comprising resilient biasing means and a second fluid operated actuator means operatively connected to said clutch and constantly connected to said fluid source, said biasing means operative to change said clutch to the engaged condition thereof whenever said fluid source pressure falls below a predetermined value, and said second fluid operated actuator means operative to overcome said biasing means and allow said first fluid operated actuator means to change said clutch between the engaged and disengaged conditions thereof as long as said fluid source pressure remains above said predetermined value.

18. An improved control system for a fluid operated clutch of the type normally in an engaged condition and operable to engage and disengage a driven member of a gear selecting transmission from a drive member driven by a vehicular engine, said system of the type comprising a source of pressurized fluid and control valve means connectable to said fluid source and to a first fluid operated actuator means operatively connected to said clutch and operable to change said clutch to the disengaged condition thereof in response to an actuating signal received by said valve means, and said improvement characterized by said system including override means comprising resilient biasing means and a second fluid operated actuator means operatively connected to said clutch and constantly connected to said fluid source, said biasing means operative to change said clutch to the disengaged condition thereof whenever said fluid source pressure falls below a predetermined value, and said second fluid operated actuator means operative to overcome said biasing means and allow said first fluid operated actuator means to change said clutch between the engaged and disengaged conditions thereof as long as said fluid source pressure remains above said predetermined value.

19. The system of claim 17 or 18 wherein the clutch includes a clutch pedal and the actuating signal is provided by depression of the clutch pedal by an operator.

20. The system of claim 17 or 18 wherein said fluid operated clutch is automatic and control means is included for sensing at least one condition of the vehicle and providing said actuating signal according to the value of the condition sensed.

21. The system of claim 20 wherein the control means includes a speed sensor and the vehicular condition sensed is speed of a selected member.

22. The system of claim 18 wherein the transmission includes a park condition and said actuating signal is provided when the transmission is placed in the park condition by an operator.

23. The system of claim 18 wherein the transmission includes a park condition and said clutch remains in the engaged condition when the transmission is placed in the park condition by an operator.

24. The system of claim 17 including a linkage means operative to overcome the biasing means to disengage the clutch.

25. The system of claim 17 or 18 wherein the first and second fluid operated actuator means respectively comprise first and second piston means.

26. The system of claim 25 wherein the resilient biasing means is disposed within a chamber of said piston means.

27. The system of claim 20 including a stop pin operable to move through a wall surrounding said second fluid actuator means and prevent the biasing means from changing the clutch condition when the condition sensed by the control means reaches a predetermined value.

28. The system of claim 27 wherein the condition sensed is speed of a selected member and the predetermined value is a selected minimum speed below which the stop pin is operative to prevent the biasing means from changing the clutch condition.

29. The system of claim 27 wherein the condition sensed is speed of a selected member and the predetermined value is a selected maximum speed above which the stop pin is operative to prevent the biasing means from changing the clutch condition.

* * * * *